(12) United States Patent
Wu et al.

(10) Patent No.: US 8,521,133 B2
(45) Date of Patent: Aug. 27, 2013

(54) SYSTEM, METHOD AND TERMINAL FOR COMMUNICATION BETWEEN WAPI TERMINALS

(75) Inventors: Hong Wu, Shenzhen (CN); Jiejie Liu, Shenzhen (CN); Honggang Zhou, Shenzhen (CN); Shaolei Zhang, Shenzhen (CN); Zhisong Shu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/393,623

(22) PCT Filed: Apr. 21, 2010

(86) PCT No.: PCT/CN2010/071951
§ 371 (c)(1),
(2), (4) Date: Mar. 1, 2012

(87) PCT Pub. No.: WO2011/026329
PCT Pub. Date: Mar. 10, 2011

(65) Prior Publication Data
US 2012/0157056 A1  Jun. 21, 2012

(30) Foreign Application Priority Data

Sep. 3, 2009  (CN) .......................... 2009 1 0171287

(51) Int. Cl.
*H04M 1/66* (2006.01)
*H04W 4/00* (2009.01)
*G06F 17/00* (2006.01)

(52) U.S. Cl.
USPC ........................ 455/411; 370/328; 713/155

(58) Field of Classification Search
USPC ........................................................ 455/411
See application file for complete search history.

(56) References Cited

U.S. PATENT DOCUMENTS

2007/0286113 A1 * 12/2007 Kirke ............................. 370/328
2009/0063851 A1 *  3/2009 Nijdam ......................... 713/155

(Continued)

FOREIGN PATENT DOCUMENTS

CN  EP2214430 A1 * 10/2008
CN  100448196 C    12/2008

(Continued)

OTHER PUBLICATIONS

International Search Report for PCT/CN2010/071951 dated Jul. 19, 2010.

*Primary Examiner* — Patrick N. Edouard
*Assistant Examiner* — Timothy Pham
(74) *Attorney, Agent, or Firm* — Stephen Yang; Ling Wu; Ling and Yang Intellectual Property

(57) ABSTRACT

The present invention provides a system, method and terminal for communication between WAPI terminals, and the method includes: a calling terminal that has a WAPI function sending a WAPI link establishment request to a called terminal that has a WAPI function, and establishing a WAPI link with the called terminal, the calling terminal communicating with the called terminal directly through the established WAPI link. Using the technical scheme according to the present invention, the direct communication between the WAPI terminals can be realized, and the technical scheme is easy to implement and can reduce the communication costs, and would not be influenced by the coverage ratio of radio signal of a radio operator, a real-time communication will be realized as long as it is within the application scope of the WAPI.

10 Claims, 2 Drawing Sheets

(56) References Cited

U.S. PATENT DOCUMENTS

| | | | |
|---|---|---|---|
| 2009/0217033 A1* | 8/2009 | Costa et al. | 713/155 |
| 2011/0055569 A1* | 3/2011 | Zhang et al. | 713/170 |
| 2011/0307943 A1* | 12/2011 | Du et al. | 726/5 |
| 2012/0060205 A1* | 3/2012 | Tie et al. | 726/3 |

FOREIGN PATENT DOCUMENTS

| | | | |
|---|---|---|---|
| CN | 101483863 A | | 7/2009 |
| JP | 2009124758 A | * | 3/2009 |

\* cited by examiner

SYSTEM, METHOD AND TERMINAL FOR COMMUNICATION BETWEEN WAPI TERMINALS

TECHNICAL FIELD

The present invention relates to Wireless LAN Authentication and Privacy Infrastructure (WAPI), and particularly to a system, method and terminal for realizing a direct communication between WAPI terminals.

BACKGROUND OF THE RELATED ART

A mobile terminal is widely used as a real-time communication tool, and in order to satisfy various scenarios and usage requirements of various user groups, each operator develops a wide range of services, which in common use the network of an operator and service of an operator and require charging. For example in the cases such as business trip or travel, partners that travel together need to communication with each other, but the telephone charge seems higher if a cell phone is used directly for a call. In the same office building, there is no directly connected extension telephone in different companies, so a fixed-line or a cell phone is used for communication which requires charging. Moreover, in the places where there's poor signal or even no signal such as mountain area or outskirts, the cell phone and the like can not implement the function of real-time communication.

SUMMARY OF THE INVENTION

The technical problem that the present invention solves is to provide a system and method for communication between WAPI terminals, which can realize a direct communication between WAPI terminals, and the technical scheme is easy to implement and can reduce the communication costs.

In order to solve the above-mentioned problem, the present invention provides a method for communication between WAPI terminals, which comprises: a calling terminal that has a WAPI function sending a WAPI link establishment request to a called terminal that has a WAPI function, and establishing a WAPI link with the called terminal, the calling terminal communicating with the called terminal directly by the established WAPI link.

In the sending step, an identifier of the calling terminal is carried when the calling terminal sends the WAPI link establishment request to the called terminal;

the step of establishing the WAPI link comprises: the called terminal receiving the WAPI link establishment request, and if the request is sent by a friendly user, returning an answer signal, carrying an identifier of the called terminal, to the calling terminal, the calling terminal judging legality of the answer signal, if the answer signal is valid, establishing a WAPI link with the called terminal.

After the calling terminal sends the WAPI link establishment request, the method further comprises:

if the calling terminal fails to receive the answer signal returned by the called terminal in a preset time, re-sending the WAPI link establishment request to the called terminal, until a number of times for sending the WAPI link establishment request reaches a preset value.

The step of judging the validity of the answer signal comprises: the calling terminal judging if the identifier included in the answer signal is the identifier of the called terminal, if so, the answer signal is valid, or else, invalid.

The identifiers of the calling terminal and the called terminal are medium access control (MAC) addresses of the terminals.

The present invention also provides a system for communication between WAPI terminals, comprising a calling terminal and a called terminal; wherein, the calling terminal and the called terminal comprises a WAPI module respectively;

the WAPI module of the calling module is configured to:

send a WAPI link establishment request to the called terminal, and establish a WAPI link with the called terminal;

communicate with the called terminal directly through the established WAPI link after the establishment of the WAPI link;

the WAPI module of the called terminal is configured to:

receive the WAPI link establishment request and establish the WAPI link with the calling terminal;

communicate with the calling terminal directly through the established WAPI link after the establishment of the WAPI link.

The WAPI module of the calling terminal is configured such that: the WAPI link establishment request carries an identifier of the calling terminal;

the calling terminal and the called terminal further comprises a master control module respectively;

the WAPI module of the called terminal further configured to:

send the received WAPI link establishment request to the master control module;

after receiving a notification sent from the master control module for returning an answer, return the answer signal carrying the identifier of the respective terminal to the calling terminal;

the master control module of the called terminal is configured to: after receiving the WAPI link establishment request, judge whether the request is sent by a friendly user according to the identifier of the calling terminal, and if so, notify the WAPI module to return an answer;

the WAPI module of the calling terminal is further configured to: send the received answer signal returned by the called terminal to the master control module;

the master control module of the calling terminal is configured to: after receiving the answer signal, judge the validity of the answer signal, if the answer signal is valid, notify the WAPI module to establish the WAPI link with the called terminal.

The master control modules of the calling terminal and the called terminal are further configured to:

after the establishment of the WAPI link, send a coded data signal to the WAPI module;

and receive the data signal demodulated by the WAPI module and decode the demodulated data signal;

the WAPI module of the calling terminal is further configured to: send the received coded data signal to the called terminal through the established WAPI link;

the WAPI module of the called terminal is further configured to: send the received coded data signal to the calling terminal through the established WAPI link The WAPI module of the calling terminal is further configured to: after sending the WAPI link establishment request, judge if an answer signal is received in a preset time, if no signal is received, re-send the WAPI link establishment request until a number of times for sending the WAPI link establishment requests reaches a preset value.

The identifiers of the calling terminal and the called terminal are medium access control (MAC) addresses.

The present invention also provides a terminal, comprising: a WAPI module, the WAPI module is configured to:

when the WAPI terminal serves as a calling terminal, send a WAPI link establishment request to a called terminal, and establish a WAPI link with the called terminal; and directly communicate with the called terminal through the established WAPI link after the establishment of the WAPI link; and when the WAPI terminal serves as a called terminal, establish a WAPI link with the calling terminal after receiving the WAPI link establishment request; and directly communicate with the calling terminal through the established WAPI link after the establishment of the WAPI link.

The terminal further comprises a master control module.

The WAPI module is configured to: when the terminal serves as a calling terminal, carry an identifier of the calling terminal in the WAPI link establishment request;

the WAPI module is further configured to:

when the terminal serves a called terminal, send the received WAPI link establishment request to the master control module; and return an answer signal carrying an identifier of the present terminal to the calling terminal after receiving a notification sent from the master control module for returning an answer;

when the terminal serves as a calling terminal, send the received answer signal returned by the called terminal to the master control module;

the master control module is configured to:

when the terminal serves as a called terminal, after receiving the WAPI link establishment request, judge if the request is sent by a friendly user according to the identifier of the calling terminal, and if so, notify the WAPI module to return an answer;

when the terminal serves as a calling terminal, after receiving the answer signal, judge the validity of the answer signal, if the answer signal is valid, notify the WAPI module to establish a WAPI link with the called terminal.

The master control module is also configured to:

after the establishment of the WAPI link, send the coded data signal to the WAPI module;

and, receive and decode a data signal demodulated by the WAPI module;

the WAPI module is also configured to:

when the terminal serves as a calling terminal, send the received coded data signal to the called terminal through the established WAPI link;

when the terminal serves as a called terminal, send the
  received coded data signal to the calling terminal
  through the established WAPI link.

The WAPI module is also configured to: when the terminal serves as a calling terminal, after sending the WAPI link establishment request, judge whether an answer signal is received in a preset time, and if no answer signal is received, re-send a WAPI link establishment request, until the number of times for sending the WAPI link establishment requests reaches a preset value.

The identifier of the terminal is a medium access control (MAC) address of the terminal. To sum up, according to the present invention, a point-to-point link is established using a WAPI module of a mobile terminal to transmit information such as voice. This implementation will not result in expense because it is not through the network of a radio operator and is not influenced by the coverage ratio of radio signal of a radio operator, the real-time communication can be realized as long as it is within the application scope of the WAPI. Moreover, the present invention does not require the participation of a WAPI hot spot, since it involves a point-to-point connection between two WAPI devices and is not realized by a network such as INTERNET. Therefore, the present invention does not require the participation of a WAPI hot spot, and thus is not limited by a narrow layout range of the hot spot. And is the present invention has no additional hardware cost, and is much convenient in application mode, only simple menu operation is required, even a defined button, "push to talk", may be used, so the technical scheme according to the present invention is very promising.

PREFERRED EMBODIMENTS OF THE
PRESENT INVENTION

The present invention provides a system and method for realizing direct communication between WAPI terminals, wherein a calling terminal with a WAPI function sends a WAPI link establishment request to a called terminal with a WAPI function, and establishes a WAPI link with the called terminal, and then the calling terminal communicates with the called terminal directly through the established WAPI link.

Figure 1:
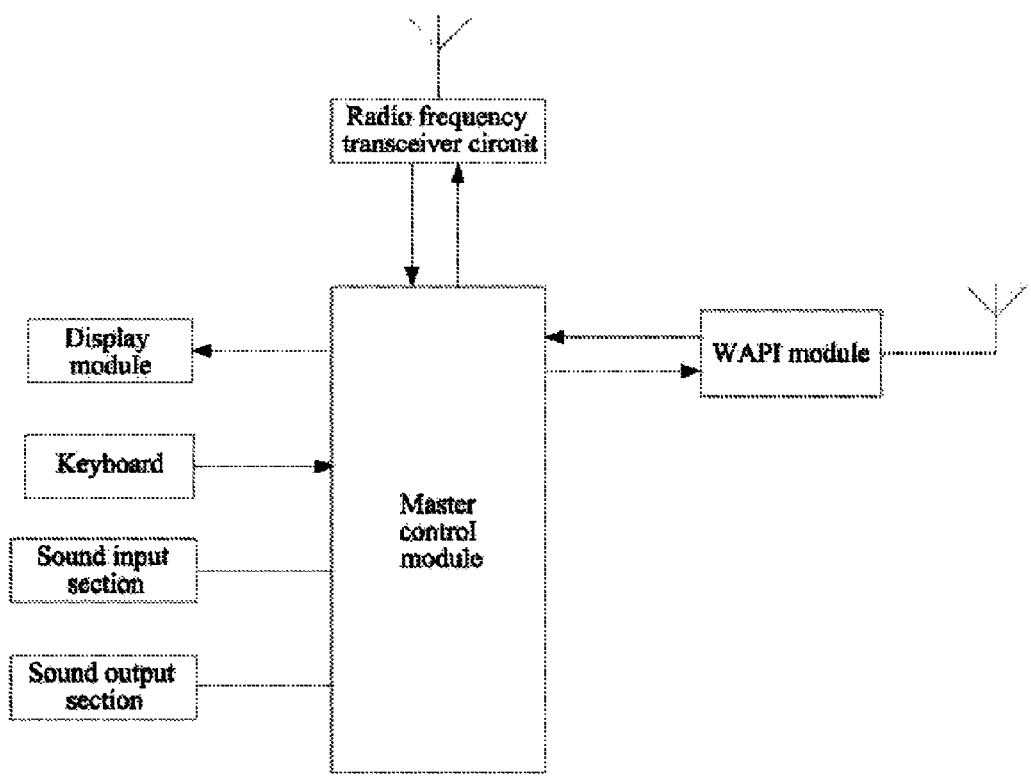
FIG. 1 is a schematic diagram of the structure of a WAPI terminal according to the present invention.

The present invention provides a system for realizing a direct communication between WAPI terminals, comprising a calling terminal and a called terminal;

As shown in FIG. 1, both the calling terminal and called terminal comprise a master control module, a radio frequency transceiver circuit (a circuit composed of cell phone radio frequency chips, for example), a WAPI module, an antenna, display section, a keyboard, a sound output section (RECEIVER/SPEAKER) and a sound input section (MIC);

the master control module of the calling terminal is configured to receive an answer signal sent from a WAPI module and then judge the validity of this answer signal, i.e., judge whether the identifier in the answer signal is an identifier of the called terminal, and if it is, notify the WAPI module to establish a WAPI link with the called terminal, or else, discard this answer signal.

the master control module of the called terminal is configured to receive the WAPI link establishment request and then judge whether this request is sent by a friendly user, and if it is, notify the WAPI module return an answer;

the master control modules of the calling terminal and the called terminal are also configured to execute operations such as video coding and channel coding, and are also configured to send a coded signal to the WAPI module when the user selects a WAPI direct communication function, and send the coded signal to a radio frequency transceiver circuit when the user does not select the WAPI direct communication function; and are also configured to decode after receiving a signal sent by the radio frequency transceiver circuit or the WAPI module, and send the decoded signal to RECEIVER/SPEAKER to play;

the radio frequency transceiver circuit is configured to send the data signal sent by the master control module, and is also configured to demodulate the signal sent by the antenna and send it to the master control module;

the WAPI module of the calling module is configured to send a WAPI link establishment request to the called terminal when started, wherein an identifier of this terminal—for example a Media Access Control (MAC) address—is carried in the request, the module is also configured to send the received answer signal to the master control module; and start to establish a link, namely, synchronization, rate engagement, check and so on, with the called terminal upon receiving a notification for establishing a WAPI link to establish a WAPI link that can transmit a voice information in real time.

The WAPI module of the calling module is also configured to directly communicate with the called terminal through the established WAPI link after the establishment of the WAPI link, i.e., sending the received coded data signal to the called terminal through the established WAPI link, and demodulating the data signal received from the antenna and then sending it to the master control module.

The WAPI module of the calling terminal is also configured to, after sending the WAPI link establishment request, judge if an answer signal is received in a preset time, and if it has not been received, re-send a WAPI link establishment request until the number of times for sending the WAPI link establishment requests reaches a preset value.

The WAPI module of the called terminal is configured to send the received WAPI link establishment request to the master control module when started, and is also configured to return an answer signal to the calling terminal after receiving the notification from the master control module for sending an answer, wherein the answer signal carriers an identifier of this terminal (a MAC address for example);

the WAPI module of the called terminal is also configured to directly communicate with the calling terminal through the established WAPI link after the establishment of the WAPI link, i.e., sending the received coded data signal to the calling terminal through the established WAPI link, and demodulating the data signal received from the antenna and then sending it to the master control module.

The sound output section (RECEIVER/SPEAKER) is configured to receive a modulated signal sent by the master control module and then play a voice;

The sound input section (MIC) is configured to sample a voice signal, and send a transformed electrical signal to the master control module.

Figure 2:
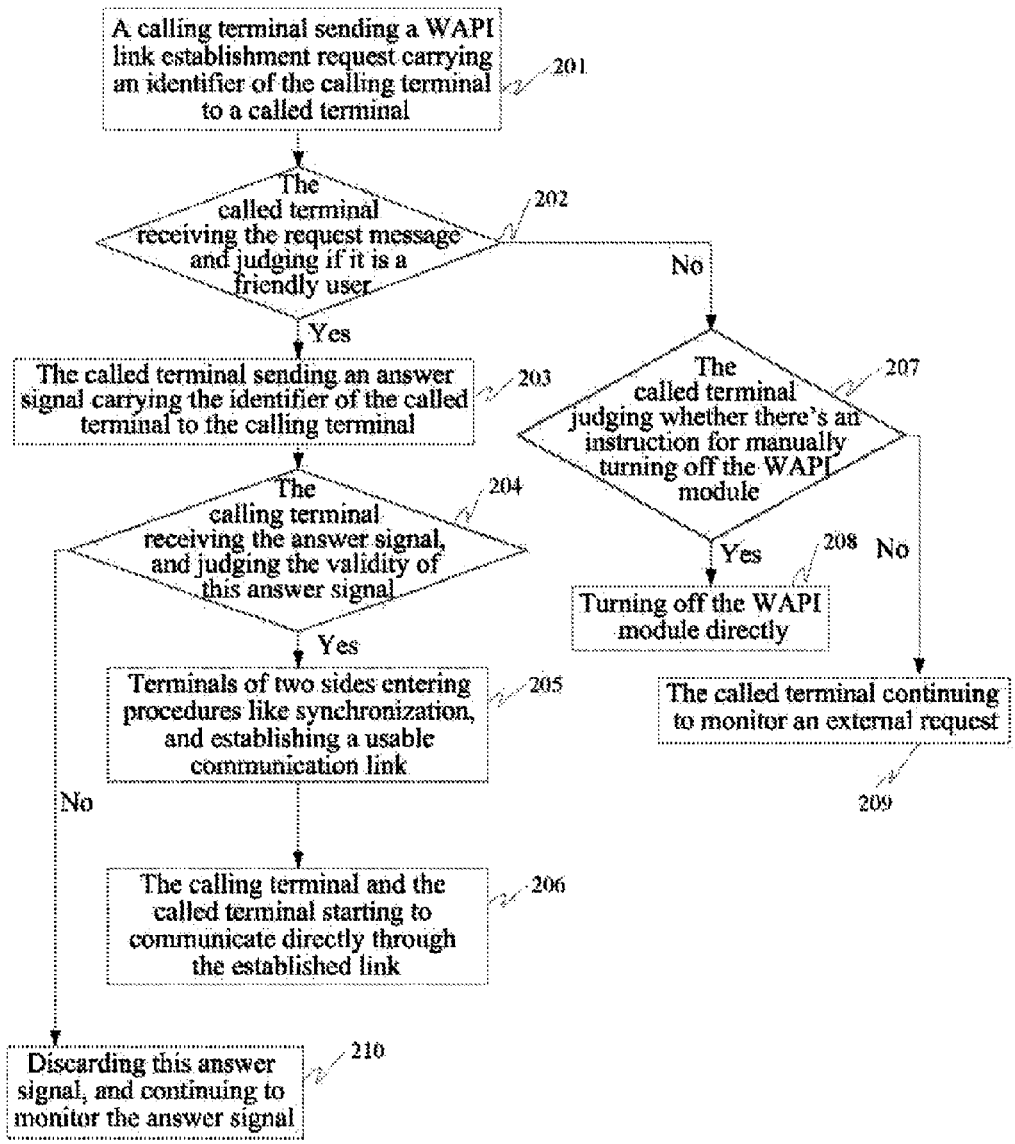
FIG. 2 is a flowchart of link establishment and direct communication in the method according to the present invention.

The embodiment provides a method for realizing direct communication between WAPI terminals, as shown in FIG. 2, comprises the following steps.

In step 201, a calling terminal sends a WAPI link establishment request to a called terminal, wherein the request message carries an identifier of the calling terminal (may be a MAC address for example);

In step 202, the called terminal receives the request message and compares it with a locally stored friendly user, and judges if it is a friendly user, if yes, step 203 is executed, or else, step 206 is executed;

Step 203, the called terminal sends an answer signal to the calling terminal, wherein an identifier (may be a MAC address for example) of the called terminal is carried;

In step 204, the calling terminal receives the answer signal, and judges the validity of this answer signal, and if it is valid, step 205 is executed, or else, step 210 is executed;

Judging the validity means: the calling terminal judges whether the identifier included in the answer signal is the identifier of the called terminal, if yes, it is judged as valid, or else, invalid.

In step 205, terminals of two sides start to establish a WAPI link, i.e., establishing a usable WAPI communication link.

The process for establishing the WAPI link includes synchronization, rate engagement, check and so on.

In step 206, the calling terminal and the called terminal start to realize a direct communication through the established WAPI link.

After the establishment of the link, the called terminal may prompt the owner that there's a calling friendly user through voice, vibration or display. When the user selects to answer, the signal such as voice may be transparently transmitted through this link, therefore achieving direct communication between the two sides.

In step 207, the called terminal judges whether there's an instruction for manually turning off the WAPI module, if there is, step 208 is executed, or else, step 209 is executed;

In step 208, the WAPI module is turned off directly;

In step 209, the called terminal continues to monitor an external request.

In step 210, this answer signal is discarded, and the monitoring of the answer signal continues.

The calling terminal may be also configured with a timer, which is configured to judge if an answer signal is received in a preset time (3 seconds for example), and if no answer signal of the called terminal is received in the preset time, a link establishment request is re-sent until the number of times (3 times for example) for sending the WAPI link establishment requests reaches a preset value. If the number of times for sending has reached the preset value but there's still no answer, the other end is prompted that there is no answer. At this moment, it is possible that the called user does not turn on the WAPI function, so the calling terminal may notify the called user to turn on the WAPI function, and then resend a request, and wait for a response.

The WAPI module of the called terminal may be started by a user initiatively, or the WAPI module may be started after a request short message is received from a mobile terminal A.

According to the present invention, a point-to-point link is established by a WAPI calling flow. The WAPI terminal of the present invention may utilize two communication modes, which are the same in the front-end processing of a signal, but are different in the transceiver circuit part, i.e., one depends on a general radio frequency transceiver circuit while the other uses a WAPI module; when using a WAPI module, the primary processer switches the data channel to the WAPI module, and communicates in real-time through the established link so as to achieve the purpose of free communication, and it is not influenced by the conditions such as radio base station and hot spot distribution.

The present invention also provides a terminal, comprising: a WAPI module, the WAPI module is configured to:

when a WAPI terminal serves as a calling terminal, send a WAPI link establishment request to a called terminal, and establish a WAPI link to the called terminal; and directly communicate with the called terminal through the established WAPI link after the establishment of the WAPI link; and when a WAPI terminal serves as a called terminal, establish a WAPI link with the calling terminal after the establishment of the WAPI link; and directly communicate with the calling terminal through the established WAPI link after the establishment of the WAPI link.

The terminal also includes a master control module, the WAPI module is configured such that when the terminal serves as a calling terminal, the WAPI link establishment request carriers an identifier of the calling terminal;

the WAPI module is also configured to:

when the terminal serves as a called terminal, send the received WAPI link establishment request to the master control module; and return an answer signal, which carries the identifier of this terminal, to the calling terminal after receiving a notification sent from the master control module for returning an answer;

when the terminal serves as a calling terminal, send the received answer signal returned by the called terminal to the master control module;

the master control module is configured to:

when the terminal serves as a called terminal, after receiving a WAPI link establishment request, judge if the request is sent by a friendly user according to the identifier of the calling terminal, and if it is, notify the WAPI module to return an answer;

when the terminal serves as a calling terminal, after receiving the answer signal, judge the validity of the answer signal, and if it is valid, notify the WAPI module to establish a WAPI link with the called terminal.

The master control module is also configured to:

after the establishment of the WAPI link, send a coded data signal to the WAPI module;

and, receive the data signal demodulated by the WAPI module, and decode it;

the WAPI module is also configured to:

when the terminal serves as a calling terminal, send the received coded data signal to the called terminal through the established WAPI link;

when the terminal serves as a called terminal, send the received coded data signal to the calling terminal through the established WAPI link.

The WAPI module is also configured to: when the terminal serves as a calling terminal, after sending the WAPI link establishment request, judge whether the answer signal is received in a preset time, and if no answer signal is received, re-send a WAPI link establishment request, until the number of times for sending the WAPI link establishment requests reaches a preset value.

The identifier of the terminal is a medium access control (MAC) address of the terminal.

Industrial Applicability

According to the present invention, a point-to-point link is established using a WAPI module of a mobile terminal to transmit information such as voice. This implementation will not result in expense because it is not through the network of a radio operator and is not influenced by the coverage ratio of radio signal of a radio operator, the real-time communication can be realized as long as it is within the application scope of the WAPI. Moreover, the present invention does not require the participation of a WAPI hot spot, since it involves a point-to-point connection between two WAPI devices and is not realized by a network such as INTERNET. Therefore, the present invention does not require the participation of a WAPI hot spot, and thus is not limited by a narrow layout range of the hot spot. And is the present invention has no additional hardware cost, and is much convenient in application mode, only simple menu operation is required, even a defined button, "push to talk", may be used, so the technical scheme according to the present invention is very promising.

What is claimed is:

1. A method for communication between Wireless LAN Authentication and Privacy Infrastructure (WAPI) terminals, comprising:

a calling terminal that has a WAPI function sending a WAPI link establishment request to a called terminal that has the WAPI function, and establishing a WAPI link with the called terminal, the calling terminal communicating with the called terminal directly by the established WAPI link;

wherein, an identifier of the calling terminal is carried when the calling terminal sends the WAPI link establishment request to the called terminal; and the answer signal carries an identifier of the called terminal;

when the calling terminal fails to receive the answer signal returned by the called terminal in a preset time, the calling terminal re-sending the WAPI link establishment request to the called terminal, until the number of times for sending the WAPI link establishment request reaches a preset value;

the step of establishing the WAPI link comprises: after receiving the WAPI link establishment request, the called terminal returning an answer signal to the calling terminal when the called terminal determines the request is sent from a friendly user by comparing it with the pre-stored user information, the calling terminal check the validity of the answer signal, and when the answer signal is validated, the calling terminal establishing the WAPI link with the called terminal.

2. The method according to claim 1, wherein, the step of judging the validity of the answer signal comprises: the calling terminal judging whether the identifier included in the answer signal is the identifier of the called terminal, if yes, the answer signal is valid, or else, the answer signal is invalid.

3. The method according to claim 2, wherein, the identifiers of the calling terminal and the called terminal are medium access control (MAC) addresses of the terminals.

4. The method according to claim 1, wherein, the identifiers of the calling terminal and the called terminal are medium access control (MAC) addresses of the terminals.

5. A system for communication between Wireless LAN Authentication and Privacy Infrastructure (WAPI) terminals, comprising a calling terminal and a called terminal; wherein, the calling terminal and the called terminal comprises a WAPI module respectively;

the WAPI module of the calling module is configured to:

send a WAPI link establishment request to the called terminal, and establish a WAPI link with the called terminal;

communicate with the called terminal directly through the established WAPI link after the WAPI link is completely established;

the WAPI module of the called terminal is configured to:

establish the WAPI link with the calling terminal after receiving the WAPI link establishment request;

communicate with the calling terminal directly through the established WAPI link after the WAPI link is completely established;

the calling terminal and the called terminal further comprises a master control module respectively;

the WAPI module of the called terminal is further configured to:

send the received WAPI link establishment request to the master control module;

after receiving a notification for returning an answer sent from the master control module, return an answer signal to the calling terminal;

the master control module of the called terminal is configured to: after receiving the WAPI link establishment request, judge whether the request is sent by a friendly user, and if yes, notify the WAPI module to return an answer;

the WAPI module of the calling terminal is further configured to: send the received answer signal returned by the called terminal to the master control module; carry an identifier of the calling terminal in the WAPI link establishment request; and the answer signal carries the identifier of the called terminal;

the WAPI module of the calling terminal is further configured to: after sending the WAPI link establishment request, judge whether an answer signal is received in a preset time, if not, re-send the WAPI link establishment request until the number of times for sending the WAPI link establishment requests reaches a preset value;

the master control module of the calling terminal is configured to: after receiving the answer signal, judge the validity of the answer signal, if the answer signal is valid, notify the WAPI module to establish the WAPI link with the called terminal.

6. The system according to claim 5, wherein, the master control modules of the calling terminal and the called terminal are further configured to:

after the WAPI link is completely established, send a coded data signal to the WAPI module;

and receive the data signal demodulated by the WAPI module and decode the demodulated data signal;

the WAPI module of the calling terminal is further configured to: send the received coded data signal to the called terminal through the established WAPI link;

the WAPI module of the called terminal is further configured to: send the received coded data signal to the calling terminal through the established WAPI link.

7. The system according to claim 5, wherein, the identifiers of the calling terminal and the called terminal are medium access control (MAC) addresses.

8. A terminal, comprising: a WAPI module and a master control module, wherein, the WAPI module is configured to:

when the WAPI terminal serves as a calling terminal, send a WAPI link establishment request to a called terminal, and establish a WAPI link with the called terminal; and directly communicate with the called terminal through the established WAPI link after the WAPI link is established completely; carry an identifier of the calling terminal in the WAPI link establishment request; and the answer signal carries an identifier of the called terminal;

after sending the WAPI link establishment request, judge whether an answer signal is received in a preset time, and if not, re-send the WAPI link establishment request, until the number of times for sending the WAPI link establishment requests reaches a preset value; and when the WAPI terminal serves as a called terminal, establish a WAPI link with the calling terminal after receiving the WAPI link establishment request; and directly communicate with the calling terminal through the established WAPI link after the WAPI link is established completely;

the WAPI module is further configured to:

when the terminal serves the called terminal, send the received WAPI link establishment request to the master control module; and return an answer signal to the calling terminal after receiving a notification for returning an answer sent from the master control module;

when the terminal serves as the calling terminal, send the received answer signal returned by the called terminal to the master control module;

the master control module is configured to:

when the terminal serves as the called terminal, after receiving the WAPI link establishment request, judge whether the request is sent by a friendly user, and if yes, notify the WAPI module to return an answer;

when the terminal serves as the calling terminal, after receiving the answer signal, judge the validity of the answer signal, if the answer signal is valid, notify the WAPI module to establish a WAPI link with the called terminal.

9. The terminal according to claim 8, wherein, the master control module is further configured to:

after the WAPI link is completely established, send the coded data signal to the WAPI module;

and, receive and decode a data signal demodulated by the WAPI module;

the WAPI module is further configured to:

when the terminal serves as the calling terminal, send the received coded data signal to the called terminal through the established WAPI link;

when the terminal serves as the called terminal, send the received coded data signal to the calling terminal through the established WAPI link.

10. The terminal according to claim 8, wherein, the identifier of the terminal is a medium access control (MAC) address of the terminal.

* * * * *